Aug. 2, 1949.    R. G. VANDERWEIL    2,477,839
LAMINATED HEAT-EXCHANGE FIN
Filed July 18, 1944    3 Sheets-Sheet 1
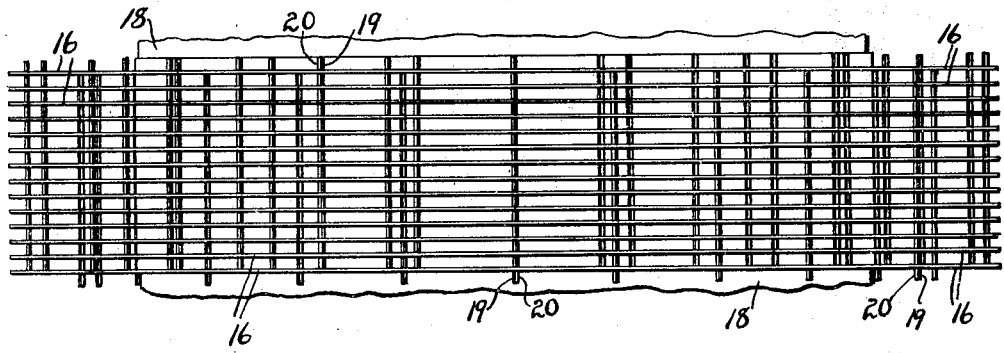
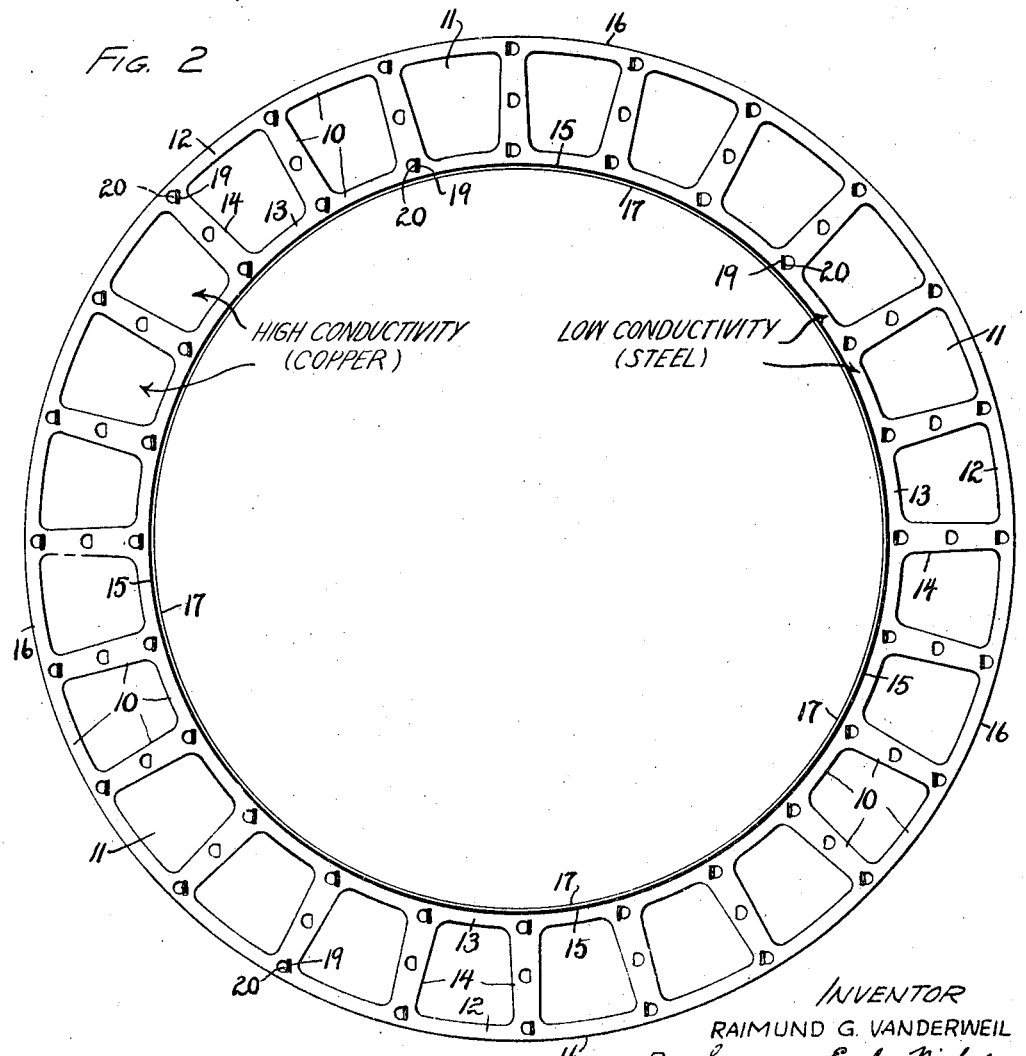
INVENTOR
RAIMUND G. VANDERWEIL
By Seymour, Earle + Nichols
ATTORNEYS

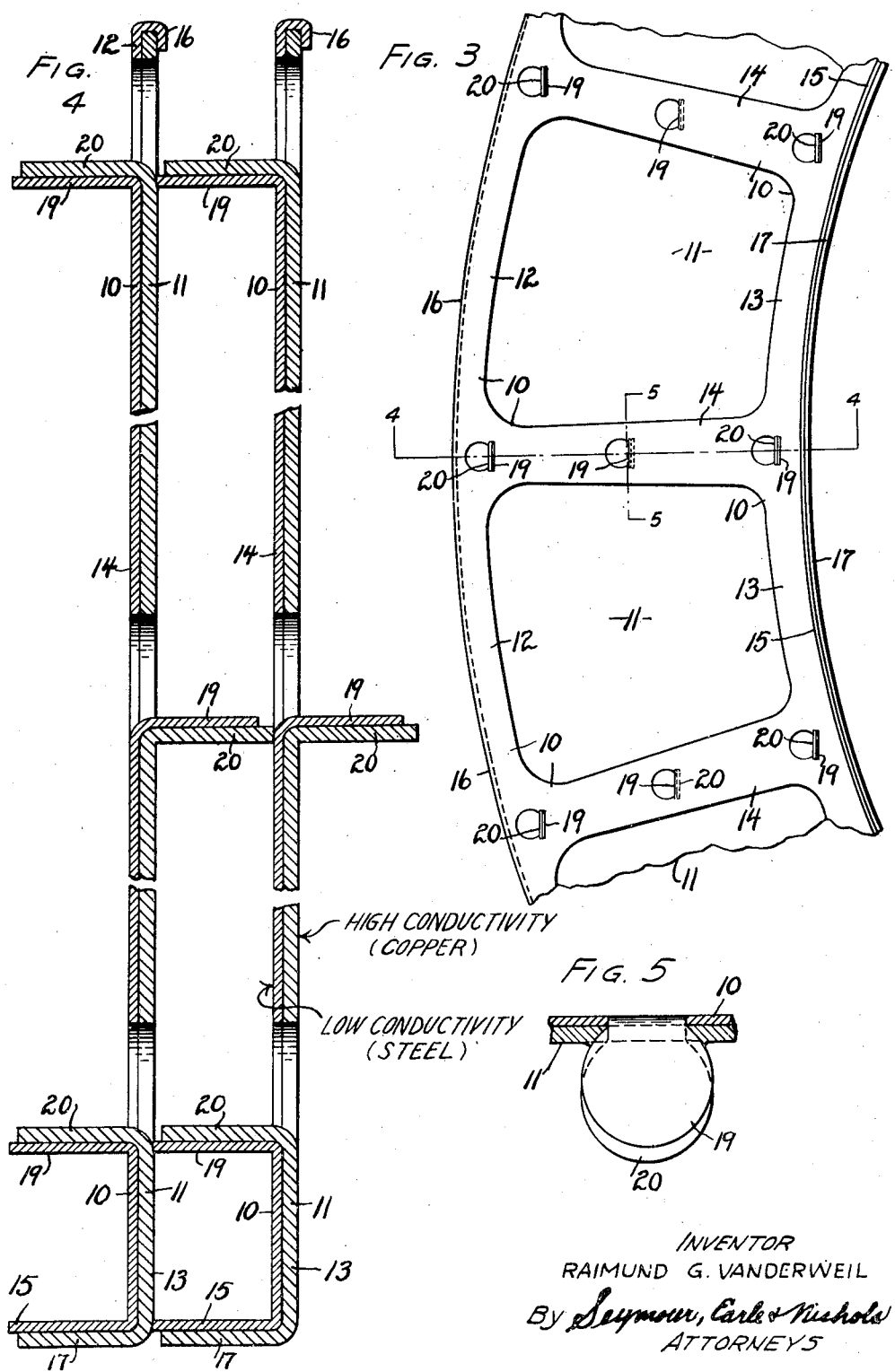

Aug. 2, 1949. R. G. VANDERWEIL 2,477,839
LAMINATED HEAT-EXCHANGE FIN
Filed July 18, 1944 3 Sheets-Sheet 3
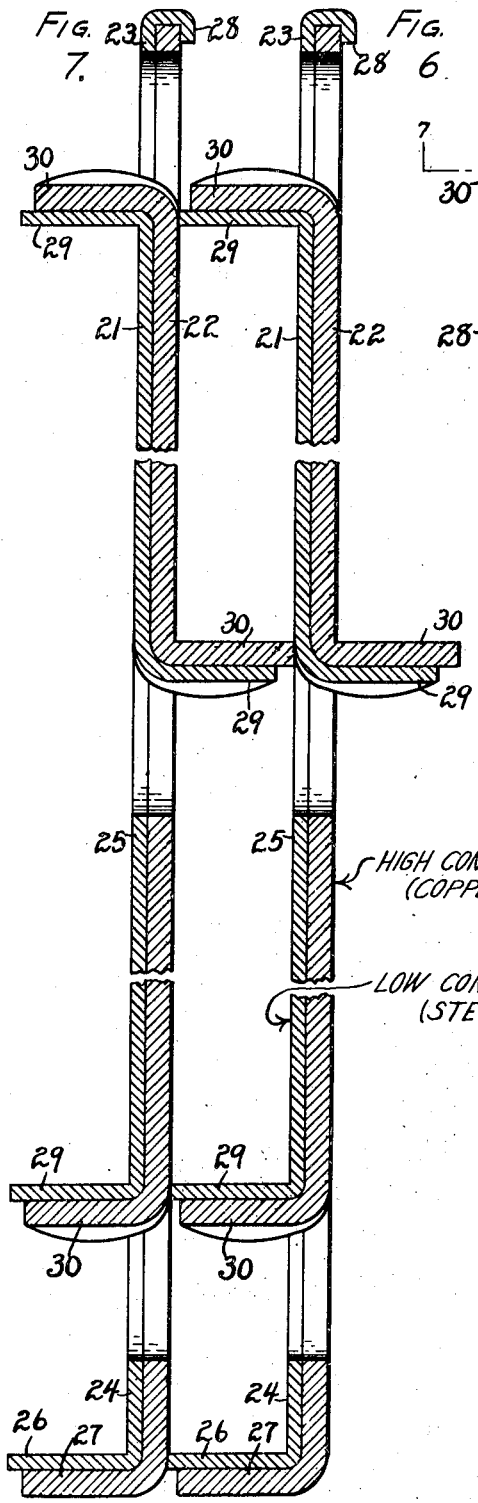
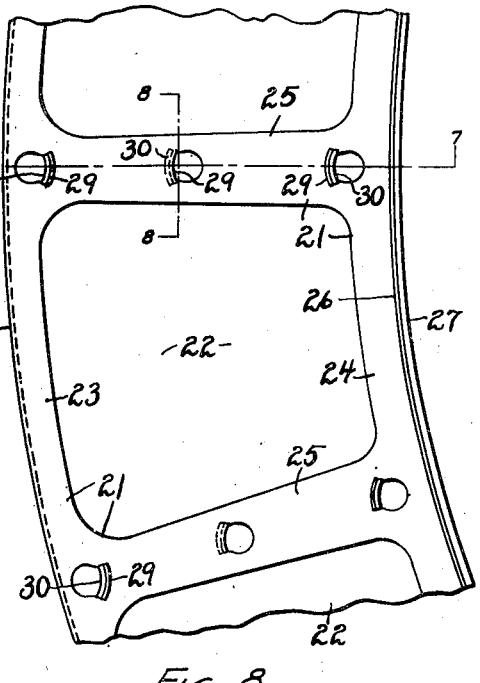
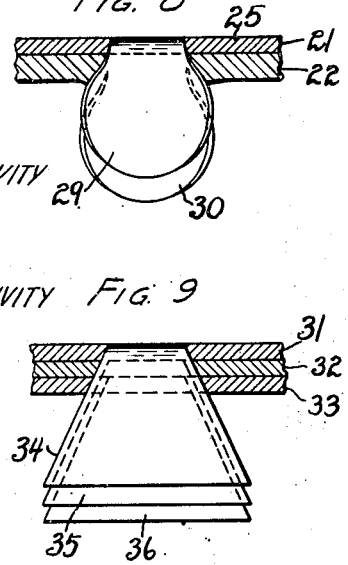
INVENTOR
RAIMUND G. VANDERWEIL
ATTORNEYS Patented Aug. 2, 1949

2,477,839

UNITED STATES PATENT OFFICE 2,477,839

LAMINATED HEAT-EXCHANGE FIN

Raimund G. Vanderweil, Woodbury, Conn., assignor to Chase Brass & Copper Co. Incorporated, Waterbury, Conn., a corporation Application July 18, 1944, Serial No. 545,464.

2 Claims. (Cl. 257—261)

The present invention relates to improvements in heat-exchange fins and relates more particularly to improvements in laminated heat-exchange fins, i. e., heat-exchange fins composed of a plurality of layers or laminations of sheet material. The laminated heat-exchange fins of the present invention are especially well suited for use in effecting the cooling of the cylinders and other parts of air-cooled internal-combustion engines, though available for many other uses.

One of the main objects of the present invention is to provide a superior laminated heat-exchange fin in which the laminations are secured together in a simple, reliable and effective manner.

Another object of the present invention is to provide an efficient laminated heat-exchange fin having means which will serve the combined purpose of securing together the laminations of the fin and effecting the spacing thereof with respect to an adjacent fin.

Still another object of the present invention is to provide a simple, reliable and effective laminated heat-exchange fin having means which will discharge the double function of securing together the laminations of a given fin, and coacting with an adjacent heat-exchange fin to minimize flexing and warping under conditions of high temperature and high-velocity air or the like.

With the above and other objects in view, as will appear to those skilled in the art from the present disclosure, this invention includes features in the said disclosure which are not claimed in my co-pending application Ser. No. 543,881, filed July 7, 1944, now Patent No. 2,426,536 issued August 26, 1947.

In the accompanying drawings, in which certain modes of carrying out the present invention are shown for illustrative purposes:

Fig. 1 is a broken view in side elevation of the cylinder of an air-cooled aircraft engine equipped with a group of laminated heat-exchange fins embodying the present invention;

Fig. 2 is a face view of one of the laminated heat-exchange fins shown in Fig. 1;

Fig. 3 is a broken face view on an enlarged scale of a portion of one of the heat-exchange fins;

Fig. 4 is a broken transverse sectional view on an enlarged scale taken on the line 4—4 of Fig. 3 and showing an additional fin associated with the fin of Fig. 3;

Fig. 5 is a sectional view taken on the line 5—5 of Fig. 3;

Fig. 6 is a broken face view similar to Fig. 3, but showing a modified form of securing-means;

Fig. 7 is a broken transverse sectional view on an enlarged scale taken on the line 7—7 of Fig. 6;

Fig. 8 is a sectional view taken on the line 8—8 of Fig. 6; and

Fig. 9 is a view similar to Fig. 8, but illustrating still another form of securing-means.

The structure of Figs. 1 to 5 inclusive

The particular two-layer laminated heat-exchange fin illustrated in Figs. 1 to 5 inclusive, comprises what may be aptly termed a "supporting-plate- or -member" generally designated by the reference character 10, and a "heat-transfer plate or -member" generally designated by the reference character 11.

The supporting-plate 10 above referred to, and the heat-transfer plate 11 are both of ring-like form, though both may be of other shapes to meet the requirements of various situations. The said supporting-plate 10 is, in the particular instance shown, skeletonized so as to result in the formation of an outer margin-portion 12 and an inner margin-portion 13, integrally connected by a plurality of spoke-like bridging-portions or -arms 14 which latter, in the instance shown, extend substantially radially, though not necessarily so.

The inner edge of the supporting-plate 10 is bent so as to extend substantially perpendicularly with respect to the plane of the main portion of the said plate to provide a stiffening-flange 15 integral with the inner margin-portion 13. The outer extremity of the outer margin-portion 12 of the supporting-plate 10 is bent around the outer edge of the heat-transfer plate 11 and against the opposite face thereof to form a clamping-rim 16, as is especially well shown in Fig. 4.

The inner edge of the heat-transfer plate 11 is also bent so as to extend substantially perpendicularly with respect to the plane of the main portion of the said plate to provide a stiffening-flange 17, the outer face of which is in close contact with the inner face of the stiffening-flange 15 of the supporting-plate 10. The supporting-plate 10 and the heat-transfer plate 11 may be formed of any suitable materials, but it is preferred that the plate 10 be of a different material from that of which the plate 11 is formed. For instance, the suporting-plate 10 may be formed of sheet metal having the characteristics at elevated temperatures of relatively-high modulus of elasticity, high tensile-strength (and hence high flexural-strength) combined with relatively-low conductivity as compared to the material of which the heat-transfer plate 11 is formed. Among the many sheet materials suitable for providing the characteristics just referred to, may be mentioned high carbon steel, silicon bronze, nickel, nickel alloys, stainless steel, etc.

The heat-transfer plate 11 may be formed of sheet material having characteristics at elevated temperatures of relatively-low modulus of elasticity and relatively-high heat conductivity as compared to the material of which the aforesaid supporting-plate 10 is formed. Suitable materials for the said heat-transfer plate are numerous, and among which may be mentioned copper, silver and aluminum.

The particular qualities and relationships above referred to in connection with the supporting-plate 10 and the complemental heat-transfer plate 11, are not essential to the present invention, but are preferred when the heat-exchange fin is to be employed for the cooling of a cylinder such as 18 (Fig. 1) of air-cooled internal-combustion engines.

For the purpose of securing the supporting-plate 10 and the heat-transfer plate 11 or their equivalents together, the metal of both plates is pierced (preferably simultaneously) at predetermined spaced-apart points and around only but a portion of the circumference of a circle. In the instances shown in the figures now under discussion, the piercing lines are C-shaped and extend for about three-quarters of the circumference of a circle, thus leaving plates 10 and 11 respectively with integral tongues 19 and 20. The tongues 19 and 20 may be jointly deflected in one direction or the other, and are preferably deflected so as to stand substantially perpendicularly with respect to the plane of the assembly of which they form a part.

Reference may now be had to the upper and lower portions respectively of Fig. 4, in which it will be noted that at these particular locations the tongues are so deflected that a given tongue 20 of a plate 11 is forced through the registering perforation in the adjacent plate 10 from which a tongue 19 has also been deflected. Inasmuch as the tongues 20 at their point of integral attachment to a given plate 11 are of tapered form, they will crowd against the material of the plate 10 and thus become wedged in place. As thus deflected, each of the tongues 20 becomes in effect an anchoring-tongue serving to firmly interlock the two plates 10 and 11 together. Under these conditions, the outer ends of the tongues 19 of the plate 10 will normally extend perpendicularly a distance slightly beyond the ends of the tongues 20, and may be utilized for engagement with an adjacent heat-exchange fin to maintain spaced relationship and to afford mutual support and stabilization between fins.

In instances where the plate 11 is formed of copper or other relatively-soft material as compared to steel or other relatively-hard material of which the plate 10 may be formed, the tongues 20 will be relatively soft as compared to the tongues 19. It is, therefore, preferred to deflect the said pairs of tongues in opposite directions from a given plate. Under the conditions just described, the relatively-soft tongues 20 will be sufficiently rigid to engage with an adjacent fin to effect mutual stabilization and spacing but such soft tongues will be inferior to the more rigid tongues 19 in effecting a local interlocking between the plates 10 and 11.

Reference may now be had to the central portion of Fig. 4 wherein it will be noted that the tongues 19 and 20 have been deflected in a direction opposite from the direction of deflection of the tongues at the respective upper and lower ends of the said figure. Under these conditions, a given tongue 19 extends through and is wedged into the adjacent portion of the registering aperture in the plate 11 from which the adjacent tongue 20 has been deflected, to thus locally secure the two plates together. Under the conditions just described, the tongue 20 will extend to a greater degree than the tongue 19, and hence may be utilized to engage with an adjacent fin to afford mutual stabilization. The wedging interlocking effect achieved by the deflection of the tongue of one lamination to another lamination, is especially well illustrated in Fig. 5.

In Figs. 1, 2 and 3, it will be noted that all of the tongues 19 and 20 extend in parallelism with all other tongues. This arrangement is preferred when it is desired to produce minimum turbulence in the air streams flowing between the fins when air is flowing in a given direction such, for instance, as upwardly from the bottom of Fig. 2. In instances, however, where turbulence is desired, the various pairs of complemental tongues 19 and 20 or their equivalent may be arranged at different angles with respect to other complemental pairs of tongues, so that the desired turbulent effect may be achieved.

The structure of Figs. 6, 7 and 8

In the figures just deferred to, a two-layer laminated heat-exchange fin is also shown which comprises a skeletonized plate 21 and an unskeletonized plate 22. Like the supporting-plate 10 of the construction previously described, the skeletonized plate 21 includes an outer margin-portion 23 and an inner margin-portion 24, which two margin-portions are integrally interconnected by arms or bridging-portions 25.

The inner edge of the inner margin-portion 24 of the plate 21 is bent up at a right angle to the plane of the plate to provide a stiffening-flange 26, which lies against the outer face of a stiffening-flange 27 formed integral with and extending perpendicularly from the inner edge of the plate 22. The extreme outer edge of the outer margin-portion 23 of the plate 21 is bent around the outer periphery of the plate 22 and thence inwardly against the face thereof opposite the plate 21 to provide a clamping-rim 28, as is shown especially well in Fig. 7.

At desired intervals, the two plates 21 and 22 are cut or pierced in a suitable manner to provide each thereof with integral tongues 29 and 30 respectively, which tongues are deflected so as to stand substantially perpendicularly with respect to the plane of the laminated heat-exchange fin.

At a given location adjacent the outer edge of the structure and also adjacent the inner edge of the structure, the complemental tongues 29 and 30 of the plates 21 and 22 respectively, are bent in such direction, in the instance shown, that a given tongue 30 of the plate 22 is forced through the adjacent aperture in the plate 21, and due to the tapering shape of their inner portions, the said tongues 30 are wedged into the material surrounding the given piercing or aperture, to thereby lock the two plates together at these locations. Also, in the instance shown, the central portions of the plates are so pierced that each of the tongues 29 of the plate 21 is forced through the aperture in the plate 22 formed by the displacement of the adjacent tongue 30, and caused to wedge in the contracted portion of such aperture to thereby locally lock the two plates 21 and 22 together.

In the structure of Figs. 6, 7 and 8, the tongues 29 and 30 are concavo-convex in horizontal cross section. This effect may be achieved by appropriately shaping the tools which serve to deflect the tongues 29 and 30.

The structure of Fig. 9

In Fig. 9, a fragment of a laminated heat-exchange fin is illustrated which comprises three layers of sheet metal or the like, respectively designated by the reference characters 31, 32 and 33. The plates are simultaneously pierced to provide straight-sided wedge-shaped tongues 34, 35 and 36 respectively integral with the plates 31, 32 and 33. Preferably, the intermediate layer 32 is formed of steel or the like, while the layers 31 and 33 are formed of copper or other relatively-high heat-conductive material.

Due to the shape of the base portions of the tongues, the tongue 34, for instance, wedges into the aperture in both the plates 32 and 33 while the tongue 35 wedges into the aperture in the plate 32.

By means of the tongues shown in Fig. 9, a wedging action is secured which is fundamentally the same as that secured by means of the tongues 19—20 and 29—30 of the structures previously described.

The term "wedge-shaped" as used herein, is intended to connote any of the forms of the tongues 19—20, 29—30 and 34—35—36 or their equivalent, which are characterized by a tapering portion or portions engaging an adjacent plate with a wedge-like action to locally couple the said plates together.

When the plates of any of the structures herein illustrated are assembled together, certain of the tongues described may be utilized to engage with an adjacent fin and thereby afford mutual stabilization. Furthermore, and as before pointed out, the plane in which the tongues are located may be such as to cause either the least air resistance or any desired degree of air turbulence, all according to the requirements to be met.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In a heat-exchanger: a plurality of substantially-identical laminated heat-exchange fins arranged in spaced substantially-parallel relationship, each fin comprising; a skeletonized first plate consisting of a sheet-metal material of relatively-high strength and low-heat conductivity; a second plate consisting of a sheet-metal material of relatively-low strength and high-heat conductivity as compared to the corresponding characteristics of the first plate; and fastening-means for securing said first and second plates together comprising a plurality of widely-spaced substantially-C-shaped piercings in said first and second plates, each piercing of one plate being in registry with the piercing of the other plate and the registered piercings of said plates forming compound tongues each of which comprises a C-shaped tongue of the first and second plates respectively joined integrally to the perimeter of its respective registered piercing and characterized by a contracted portion adjacent its point of joinder thereto, alternate compound tongues of each fin being deflected outwardly at substantially right angles to opposite sides thereof respectively whereby the contracted portion of the C-shaped tongue of the first plate of alternate compound tongues extends through the registering piercing of the second plate and is lockingly engaged with a portion of the perimeter thereof, the contracted portion of the C-shaped tongue of the second plate of alternate compound tongues extending through the registering piercing of the first plate and lockingly engaging with a portion of the perimeter thereof, the outer end of the tongue of the first plate of each alternate compound tongue extending beyond the outer end of its respective tongue of the second plate and the outer end of tongue of the second plate of each alternate compound tongue extending beyond the outer end of its respective tongue of the first plate, said outer ends being arranged to engage with the face of an adjacent heat-exchange fin to maintain each pair of fins in spaced-parallel stabilized relationship.

2. In a heat-exchanger: a plurality of substantially-identical laminated heat-exchange fins arranged in spaced substantially-parallel relationship, each fin comprising; a skeletonized first plate consisting of a sheet-metal material of relatively-high strength and low-heat conductivity; a second plate consisting of a sheet-metal material of relatively-low strength and high-heat conductivity as compared to the corresponding characteristics of the first plate; and fastening-means for securing said first and second plates together comprising a plurality of widely-spaced substantially-C-shaped piercings in said first and second plates, each piercing of one plate being in registry with the piercing of the other plate and the registered piercings of said plates forming compound tongues each of which is disposed in a plane substantially parallel to the plane of each of the other compound tongues of its respective fin for directing the flow of a cooling medium between successive fins of said heat-exchanger and each of which comprises a C-shaped tongue of the first and second plates respectively joined integrally to the perimeter of its respective registered piercing and characterized by a contracted portion adjacent its point of joinder thereto, alternate compound tongues of each fin being deflected outwardly at substantially right angles to opposite sides thereof respectively whereby the contracted portion of the C-shaped tongue of the first plate of alternate compound tongues extends through the registering piercing of the second plate and is lockingly engaged with a portion of the perimeter thereof, the contracted portion of the C-shaped tongue of the second plate of alternate compound tongues extending through the registering piercing of the first plate and lockingly engaging with a portion of the perimeter thereof, the outer end of the tongue of the first plate of each alternate compound tongue extending beyond the outer end of its respective tongue of the second plate and the outer end of the tongue of the second plate of each alternate compound tongue extending beyond the outer end of its respective tongue of the first plate, said outer ends being arranged to engage with the face of an adjacent heat-exchange fin to maintain each pair of fins in spaced-parallel stabilized relationship.

RAIMUND G. VANDERWEIL.

REFERENCES CITED

The following references are of record in the file of this patent:

UNITED STATES PATENTS

| Number | Name | Date |
|---|---|---|
| 837,090 | Makowski | Nov. 27, 1906 |
| 1,203,688 | Beugler | Nov. 7, 1916 |
| 1,659,920 | Murray, Jr. | Feb. 21, 1928 |
| 1,829,387 | Arnold | Oct. 27, 1931 |
| 1,902,349 | Whitaker | Mar. 21, 1933 |
| 2,134,529 | Phillips | Oct. 25, 1938 |
| 2,254,558 | Williams | Sept. 2, 1941 |
| 2,271,131 | Price | Jan. 27, 1942 |
| 2,368,403 | Barnes | Jan. 30, 1945 |

FOREIGN PATENTS

| Number | Country | Date |
|---|---|---|
| 291,685 | Great Britain | June 7, 1928 |